Figure 1:
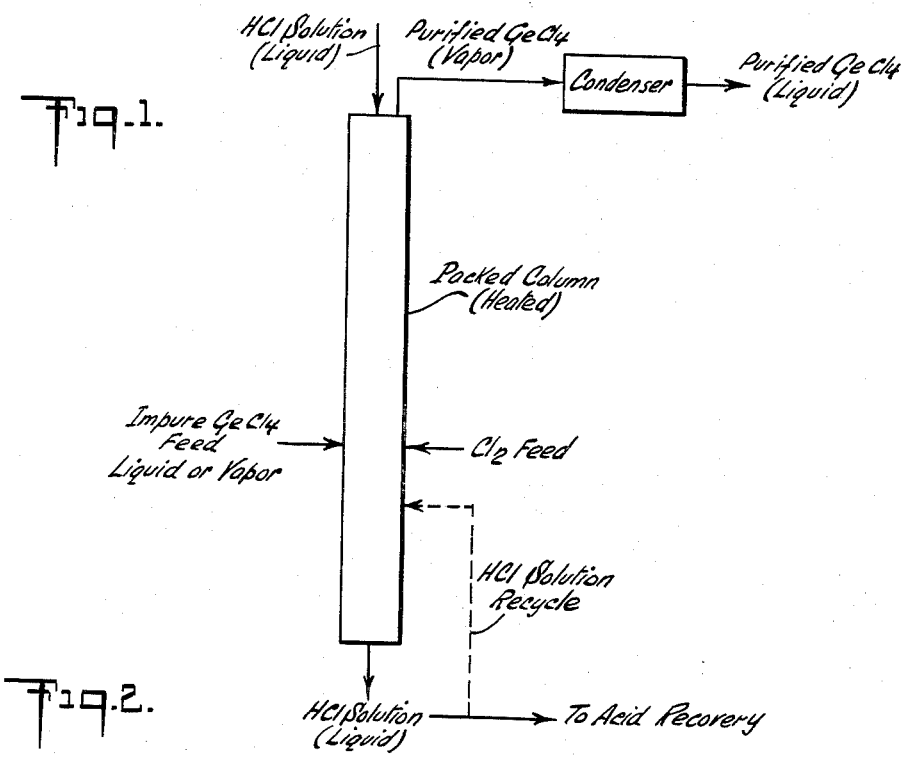

3,102,786
PURIFICATION OF GERMANIUM TETRA-
CHLORIDE
Runyon G. Ernst, Woodbridge, and Louis V. Muro,
Colonia, N.J., assignors to American Metal Climax,
Inc., New York, N.Y., a corporation of New York
Filed June 14, 1961, Ser. No. 116,970
12 Claims. (Cl. 23—87)

This invention relates to improvements in the process of purifying crude or impure germanium tetrachloride. More specifically, this invention relates to an improved process for eliminating arsenic and such other impurities as may be present in preliminarily purified $GeCl_4$ to the extent required to qualify the resulting finally purified product as suitable material for the making of electronic grade germanium metal therewith. The present invention is useful as providing an efficient, reliable and economical method of purifying $GeCl_4$ on any desired scale of operation and is especially advantageous in respect to its being readily adaptable to continuous operation whereby commercial production of highly purified $GeCl_4$ is facilitated.

As is well known, it is an essential requirement that germanium intended for semiconductor use contain impurities at levels in the order of a few parts per billion or less. For making such high purity germanium, highly purified $GeCl_4$ is generally used, said purified $GeCl_4$ being hydrolyzed to the oxide and the oxide then being reduced to germanium metal. Final purification of the metal is carried out by zone refining. It has also been established by experience that for making electronic grade germanium by the method mentioned above, it is essential that the highly purified $GeCl_4$ be such that the resulting dioxide provides metal as reduced of at least 5 ohm-cm. resistivity. If this high degree of purification is not achieved by the final purification of the $GeCl_4$, the product resulting from the aforesaid hydrolysis, reduction and zone refining steps falls short of satisfactorily meeting exacting requirements of purity in respect of the zone refined germanium as similarly determined by measurement of electrical properties.

In obtaining $GeCl_4$ of sufficiently high purity for use in making electronic grade germanium metal characterized by resistivity values of about 40 ohm-cm. or better in the zone refined condition, arsenic is by far the most difficult impurity to remove. Other impurities consisting of halide compounds of copper, zinc, antimony, tin, among others, if present in the crude $GeCl_4$ generally occur only in trace amounts and give relatively little or no trouble compared to the difficulties encountered in effectively eliminating arsenic to the extent required for the production of the desired highly purified $GeCl_4$.

It is known that satisfactory purification of crude or impure $GeCl_4$ comprising the starting material of the present invention may be accomplished by distillation or by liquid-liquid extraction methods. In connection with both of these prior art methods of purification, best results are obtained using aqueous solutions of preferably chlorine saturated hydrochloric acid. The strong acid employed serves not only to prevent hydrolysis of $GeCl_4$ before distillation or extraction but also to extract the impurities from said $GeCl_4$. An oxidant such as chlorine is used to oxidize the predominant arsenic impurity present in the $GeCl_4$ principally as volatile arsenic trichloride ($AsCl_3$) to non-volatile arsenic acid ($H_3AsO_4$). The use of chlorine or equivalent oxidant is deemed essential even though there is a difference of about 45° C. between the boiling points of $AsCl_3$ and $GeCl_4$ since $AsCl_3$ still distills over to some extent along with $GeCl_4$ if no provision is made for oxidizing the arsenic content of crude $GeCl_4$ to non-volatile form.

Although the prior art methods of purification of crude or impure $GeCl_4$ as by the aforementioned distillation or liquid-liquid solvent extraction methods do provide highly purified $GeCl_4$ possessing the prerequisite purity for making electronic grade germanium, such final purification processes are subject to several disadvantages and limitations which make the purification treatment rather costly and somewhat impractical for commercial scale production.

One of the factors limiting the usefulness of distillation as the final purification treatment of $GeCl_4$ is the difficulty encountered in maintaining satisfactory temperature control of the column to effect the required precise fractionation of the material. With chlorine being constantly flushed through the system during distillation, for example, it becomes exceedingly difficult to operate under equilibrium conditions essential for attaining the desired degree of purification without resorting to further purification treatment of the distillate involving multiple distillations or prolonged refluxing over copper etc. The rate of throughput is accordingly limited making the production of $GeCl_4$ by distillation not only slow and costly but also rather impractical for the treatment of large volumes of material.

While liquid-liquid extraction methods illustrated by the process described, for example, in U.S. Patent No. 2,811,418 using chlorine saturated aqueous solutions of HCl as the solvent for selectively removing arsenic and other impurities such as antimony, gallium, silicon, boron and aluminum overcome some of the difficulties associated with purification by distillation, such extraction processes are dependent upon high purity reagents for satisfactory results. To effect separation of the impurities from the $GeCl_4$, advantage is taken of the relatively higher solubility of the arsenic and the other impurities in the acid solvent phase based on the distribution coefficients of the various impurity substances. Since the effectiveness of the solvent phase is a function of its purity, the high degree of purification required in the case of $GeCl_4$ necessitates the use of comparatively large volumes of fresh acid. For liquid-liquid extraction it is also apparently necessary to use hydrochloric acid of minimally 8-normal concentration with the use of 12 N HCl being definitely preferred as disclosed in the hereinbefore cited patent. These requirements coupled with the need for keeping the liquid phases at low temperatures during the extraction process make liquid-liquid extraction an unduly costly method of obtaining highly purified $GeCl_4$.

It is, therefore, an object of this invention to provide an improved process of purifying crude or impure $GeCl_4$ for the production of highly purified $GeCl_4$ suitable for use in making electronic grade germanium whereby the disadvantages associated with distillation and liquid-liquid extraction methods of purification are largely overcome.

Another object of this invention is to provide a process for the purification of impure $GeCl_4$ wherein more efficient and economical use is made of the acid reagent used for removal of arsenic and other impurities present in the crude $GeCl_4$.

A further object is to provide a process for effectively purifying crude $GeCl_4$ to the degree required notwithstanding an arsenic content of as much as 20 grams or even higher per liter of said crude $GeCl_4$.

A still further object of this invention is to provide a relatively simple but highly efficient continuous process for the production of highly purified $GeCl_4$ from crude $GeCl_4$.

Other objects and advantages will become apparent as this specification proceeds.

In accordance with the present invention, impure $GeCl_4$ resulting from chlorination of germaniferous materials and preliminary purification of the chlorinated product for removal of gross impurities is subjected in the vapor phase to the scrubbing action of an aqueous solution of HCl maintained at or slightly above the boiling point of $GeCl_4$ and kept preferably saturated with chlorine. The countercurrent passage of $GeCl_4$ in vapor form against the downward flow of chlorine-saturated acid in a column of sufficient height has been found to be extremely effective for virtually complete removal of arsenic and other impurities from the feed material even though the arsenic content thereof may be rather high. The highly purified $GeCl_4$ obtained upon removal of the impurities by absorption in accordance with the present invention meets the standard of purity required for making electronic grade germanium as measured by the resistivity of the zone refined germanium subsequently made with the material.

The highly satisfactory purification achieved by elimination of the impurities by absorption obviates the need for rather high acid strengths of at least 8 N and more desirably 12 N and also the need for maintaining an extremely high purity level in respect of the acid component of the system during the purification step. Whereas these two conditions are essential for satisfactory purification of crude $GeCl_4$ by liquid-liquid extraction, the present invention provides entirely satisfactory results using the much cheaper aqueous solution of "constant boiling" hydrochloric acid of only about 6.1 N. Then too, since accumulation of impurities in the acid layer is not nearly as critical in purification by absorption as opposed to liquid-liquid extraction, the present process permits optional recycling of at least part of the acid back into the column. These factors combined with ease of operation and the ready adaptability of the process to large scale, continuous operation enable the purification of crude $GeCl_4$ to be carried out in a much more efficient and economical manner than heretofore possible. The new and novel process also lends itself readily to the effective treatment of $GeCl_4$ feed material containing appreciably larger amounts of arsenic and other impurities than heretofore deemed feasible for final purification treatment of $GeCl_4$ by continuous liquid-liquid extraction due to excessive acid contamination of the acid layer incurred thereby.

The crude or impure $GeCl_4$ referred to herein as the feed material for use in the purification process may be obtained by chlorinating any germaniferous material such as germanium scrap, sublimates from ores and concentrates, etc. in accordance with conventional practices. The chlorinated product is then treated to effect preliminary purification and concentration of the $GeCl_4$ preferably by a rather rapid distillation of the material in admixture with chlorine-saturated HCl whereby gross impurities are removed. During such treatment, a substantial portion of the arsenic which presents the major purification difficulty in the final purification step is converted by the action of the oxidant to non-volatile arsenic acid in which form its elimination along with other impurities is facilitated. The resulting crude or impure $GeCl_4$ from the aforesaid preliminary treatment for removal of the gross impurities, however, still contains varying amounts of arsenic and possibly trace quantities of other impurities making further purification of the material absolutely necessary and it is to this final purification of the crude or impure $GeCl_4$ that the preesnt invention is directed. The efficacy of the present invention as applied to the final purification of such crude or impure $GeCl_4$ is illustrated by the fact that, even with an arsenic content of as much as 20 grams per liter in said crude or impure $GeCl_4$, the material becomes sufficiently purified to lend itself to the making of zone refined germanium metal of about 40 ohm-cm. resistivity without difficulty. This indicates that the arsenic impurity level in the end product has been reduced by the overall purification treatment to not more than a few parts per billion parts of germanium with the highly purified $GeCl_4$ resulting from the absorption purification process adequately meeting the 5 ohm-cm. resistivity requirement of the metal in the "as reduced" state.

In carrying out the purification of crude or impure $GeCl_4$ in accordance with this invention to obtain highly purified $GeCl_4$ suitable for making electronic grade germanium, the feed material containing varying amounts of arsenic impurity and possibly trace amounts or somewhat more of the other usual halide impurities consisting of copper, zinc, antimony, tin, etc. is introduced into a heated absorption tower at a level close to the bottom thereof. In the absorption tower suitably consisting of a packed glass column is maintained a continuous downward flow of chlorine-containing aqueous solution of HCl kept at a temperature generally between 83 and 100° C. or thereabout during its passage through said column. Preferably, the temperature of the liquid medium should be kept only slightly above 83° C. (B.P. of $GeCl_4$) to preclude the possibility of any appreciable condensation of $GeCl_4$ vapor during its countercurrent passage upwardly in the column while at the same time avoiding the use of too high an operating temperature approaching the boiling point (approximately 110° C.) of the liquid phase.

For best results, the acid which is fed into the column from or near the top end thereof is preheated to enable improved column temperature control whereby steady state conditions may be more readily maintained during operation. The downward flow of acid solution is regulated in any desired manner as by pumping or using any other appropriate means of providing a controlled amount of acid in relation to the quantity of crude $GeCl_4$ being fed into the column. Sufficient chlorine is made available in any desired manner as by direct addition to the acid or by introduction of the chlorine into the column or both to keep the acid preferably in a saturated state during its passage through the column. Actually, somewhat less than the saturation amount of chlorine may be used, if desired, for the purpose of effecting oxidation of the arsenic to pentavalent form and for minimizing reversion of the oxidized arsenic to its trivalent state. Since it is advantageous to oxidize any residual trivalent arsenic contained in the feed material as quickly as possible, it is preferred to introduce the chlorine into the acid at about the same level of the column at which the $GeCl_4$ feed material is passed into the column.

The crude or impure $GeCl_4$ is also fed into the column at a controlled rate either ($a$) as a liquid whereupon volatilization of the $GeCl_4$ readily occurs upon contact of the liquid feed with the heated acid, or ($b$) by passing vapors generated outside of the column, as in a separate volatilization vessel, directly into the absorption column. The latter is preferred as advantageous in minimizing column temperature variations during operation. The flow rate of $GeCl_4$ feed material to the column may be controlled in any desired manner as by pumping the liquid feed material as required or by appropriately adjusting the rate at which the $GeCl_4$ vapor is generated or otherwise fed into the column depending upon whether a liquid or vapor feed is used.

It is a feature of the process of purification by absorption comprising the present invention that the acid employed need not be stronger in concentration than the readily available maximum boiling azeotrope of HCl with water commonly known as "constant boiling" HCl (B.P.$_{760}$ 110° C.), said acid having a normality of about 6.1 and containing about 20.2% HCl. Compared to the requirement for the use of at least 8 N and more desirably about 12 N HCl specified as essential for satisfactory purification of $GeCl_4$ by liquid-liquid extraction, it is definitely preferred to use said constant boiling HCl in the present process. This results in substantial savings in acid requirement costs. It will be understood that the new and novel purification method is not intended to be limited to the use of only this particular acid concentration since HCl of varying concentrations of from about 6 N to any higher acid strength may actually be used. Since the aforementioned column temperatures will tend to boil off HCl gas in excess of that comprising the constant boiling mixture, however, it will be readily apparent that the use of stronger HCl solutions serves no useful purpose.

The ratio of acid to the $GeCl_4$ fed into the column may be varied considerably depending upon the height and diameter of the column, the quality of the feed material, feed rates and other related factors. In general, it has been found that the minimum ratio of acid to $GeCl_4$ considered on a liquid volume basis should be 1:1, it being preferred, however, to use about 3 to 4 volumes of acid per unit volume of crude $GeCl_4$ to assure the desired purification result. Obviously, any higher ratio of acid to $GeCl_4$ may be used and, as previously indicated, part of the acid requirement may be met, if desired, by recycling some of the acid collected from the bottom of the column back into the column. If recycling is used, the recycle acid should be introduced into the column at a level below the middle thereof to assure passage of the vapor through relatively fresh acid at least through the upper half of the column.

It will be apparent that column design considerations will be largely dependent upon the amount of material to be processed, the quality of the feed material as it applies primarily to the arsenic content of the crude $GeCl_4$, the ratio of acid to $GeCl_4$ employed in the process and the flow rates thereof among other factors that influence the overall operation. It is important in this connection that the ascending vapor in the column be given sufficient exposure to the scrubbing action of the downward flowing acid to effect the desired degree of purification of the $GeCl_4$. In general, the column design should be such that under the operating conditions employed, a retention time for the $GeCl_4$ vapor in the packed section of the column of from about one to two minutes or slightly more is provided depending primarily upon the aforesaid quality of the crude $GeCl_4$ feed material.

With the use of a packed column ranging in diameter from about 1″ to as large as 6″ or more, a column height of 8 feet or so has been found to be usually adequate for effecting the desired degree of purification when the arsenic content of the $GeCl_4$ feed material does not exceed about 0.3 gram per liter. To accommodate feed materials of more widely varying arsenic content, however, it is generally advisable to use a minimal column height of 12 feet. For continuous operation on relatively large production scale, it is preferred to use an overall column height of about 20 to 24 feet to assure effective purification of $GeCl_4$ feed material containing as much as 20 grams per liter of arsenic. The column heights referred to herein may be provided by a single column or, alternatively, by two or more shorter columns arranged in series and appropriately interconnected to maintain continuity of flow from one column to the other with the chlorine-containing acid solution and the $GeCl_4$ vapors moving in opposite directions. Once the selection of a column of given size and diameter is made, one skilled in the art can readily determine the flow rates of acid, chlorine and $GeCl_4$ respectively that are conducive to best results with the use of a predetermined ratio of acid to $GeCl_4$.

The purified $GeCl_4$ vapors upon reaching the top of the absorption column after being sufficiently exposed to the scrubbing action of the chlorine saturated acid within the column are condensed and then refluxed to remove residual free chlorine therefrom. The highly purified $GeCl_4$ is then ready for making germanium metal therewith as by the usual steps of hydrolyzing the $GeCl_4$ to $GeO_2$, reducing the oxide to metal and zone refining said metal to produce the extremely high purity electronic grade germanium metal. The acid collected from below the column may be recycled in part as previously mentioned or used in chlorinating the germaniferous material. The $GeCl_4$ content of the spent acid may be recovered by conventional methods.

The equipment used in the absorption process hereinabove described should be constructed of inert material to minimize the risk of product contamination. The use of Pyrex glass for the columns, charging vessels, condensers, collector vessels, connecting elements, etc. has proven entirely satisfactory for the purpose. The column packing may consist of the conventional glass helices or refractory materials such as Berl saddles, Raschig rings or the like. Peristalsis type pumps are preferred for feeding the acid into the system.

The following examples setting forth specific details are illustrative of the mode and manner of carrying out the process of this invention.

*Example 1*

A 2″ inside diameter vertical column 10 feet in height constructed of Pyrex glass and having an 8¼ ft. packed section (½″ glass helices) was used in a series of experiments. The total packed length of the column was wrapped with heating tape to provide the heat required to vaporize the $GeCl_4$ and maintain it as a vapor. The bottom of the column was connected by a standard ball joint to a 10 liter Pyrex flask for collection of the descending acid. A glass conduit located near the top of the column was connected to a condenser terminating in a glass receiver flask for collecting the condenser purified product. The addition of preheated commercial grade 6 N HCl was made from the top of the column at the rate of 3.88 liters per hour. Crude $GeCl_4$ was fed as a liquid into the column at the three foot level thereof from the bottom end, said $GeCl_4$ being introduced at the rate of one liter per hour. Chlorine gas was fed into the acid stream at the rate of 70 liters per hour at the same column height level used for introducing the $GeCl_4$ into the column. The column temperatures measured by thermocouples positioned at intervals along the packed height of the column were maintained between 83 and 100° C. during operation of the column. A number of runs using impure $GeCl_4$ with arsenical contents ranging from 0.1 to 0.3 gram per liter resulted in each case in a purified $GeCl_4$ product that proved entirely satisfactory for making germanium metal possessing resistivities of 5 and 40 ohm-cm. or better in the as reduced and zone refined states respectively.

*Example 2*

A run was made in the same apparatus and under essentially the same conditions of operation as described in the preceding example excepting that the $GeCl_4$ was first vaporized outside of the column and the vapors were introduced into the column at the rate of one liter (of liquid $GeCl_4$) per hour. The arsenic elimination from feed material containing 0.3 gram per liter of arsenic was again entirely satisfactory for the production of acceptable grade dioxide suitable for making germanium metal meeting specification requirements for electronic grade germanium. With the arsenic content of the $GeCl_4$ feed material increased to 18.4 grams per liter, however, the purity of the germanium metal made with the resulting purified $GeCl_4$ was not quite up to acceptable grade as determined by resistivity measurements on the as reduced (first reduction) metal and the zone refined germanium.

*Example 3*

For purifying crude $GeCl_4$ containing up to 20 grams per liter of arsenic in continuous operation a dual column arrangement providing an overall column height of 24 feet was used. Two 12 foot columns of 4″ inside diameter constructed of double tough Pyrex glass with each column having a 10 foot packed section (¼″

Raschig rings) were positioned side by side. The crude GeCl₄ was fed into the first column in vapor form at the rate of 50 ml. (of liquid) per minute at about the 3 foot level from the bottom of said column by controlling the heat input to the vaporizer. After being partially purified by the chlorine saturated acid solution in said first column, the GeCl₄ vapors were passed overhead and condensed. The condensed GeCl₄ was revaporized and passed through the second column in the same manner at substantially the same feed rate. Constant boiling HCl of approximately 6.1 N was preheated to about 100° C. and fed into each column at the rate of 200 ml. per minute, the fresh acid being first passed downwardly through the second column and thereafter through the first column. Chlorine was bubbled into each column at the three foot level from the bottom at the rate of 5 liters per minute (14.7 p.s.i.a. and 70° F.). All containers consisted of 72-liter round bottom Pyrex glass flasks with those employed for acid preheating and vaporizing GeCl₄ being provided with heating mantles. The column temperatures were maintained between 83 and 90° C. by the use of heating mantles jacketing the columns. For condensing the GeCl₄, water cooled condensers were employed in conjunction with glycol cooled condensers with the latter being kept at about −40° C. to minimize losses of the rather volatile GeCl₄.

The above procedure carried out under steady state conditions of operation resulted in the production of highly purified GeCl₄ at the rate of nearly 3 liters per hour. The quality of the highly purified GeCl₄ obtained thereby has been found entirely satisfactory notwithstanding considerable variation in the arsenic content of the crude GeCl₄ used in the process. No difficulty whatever attributable to arsenic or other impurities was encountered in the course of processing more than a thousand liters of crude GeCl₄ in accordance with the purification process set forth in this example.

Figure 2:
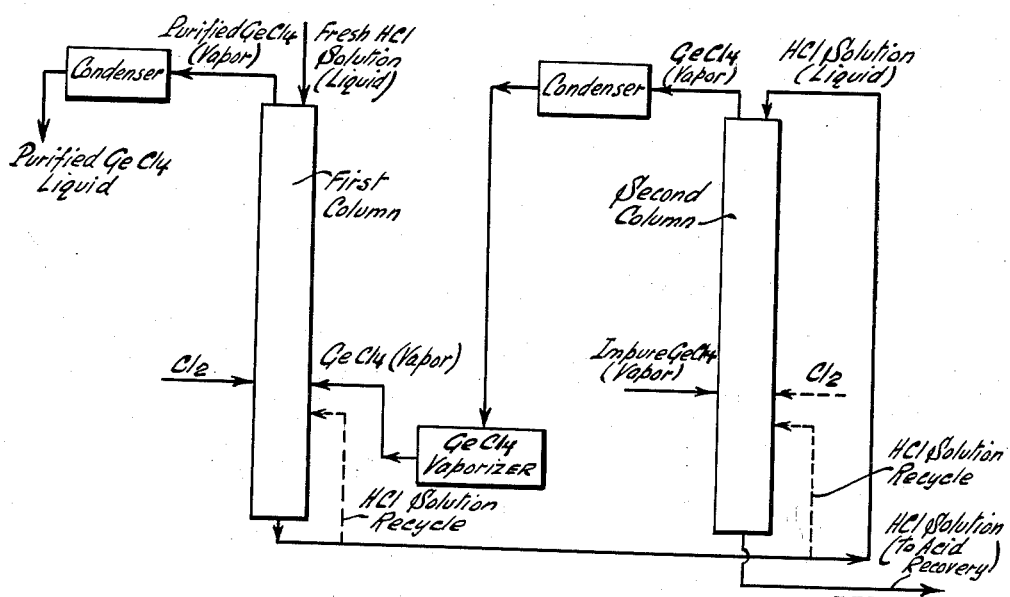

The purification process utilizing a single column as hereinabove described and also set forth in considerable detail in Example 1, is diagrammatically illustrated in FIG. 1 of the accompanying drawing. FIG. 2 diagrammatically illustrates an embodiment of the process using a dual column arrangement the operation of which is set forth in Example 3.

Although the process hereinabove described refers specifically to the use of aqueous HCl saturated with chlorine as the oxidizing agent, it will be understood that other oxidizing agents known to the art may be used in place of or in combination with chlorine for converting trivalent arsenic to the pentavalent state.

Having thus described this invention, it will be apparent to those skilled in the art that other modifications are possible. It should therefore be understood that within the scope of the appended claims, this invention may be practiced otherwise than as specifically described.

What is claimed is:

1. A continuous process for purifying impure germanium tetrachloride containing arsenic as the predominant impurity comprising:
    (a) continuously passing hydrochloric acid solution of at least 6 normal strength downwardly through a column, said acid solution being introduced at the upper region of said column and providing a liquid stream descending through said column;
    (b) maintaining said stream substantially saturated with chlorine;
    (c) continuously feeding the impure germanium tetrachloride into the column at a level below the middle thereof, the feeding rate being adjusted to maintain a ratio on a liquid volume basis of acid solution to germanium tetrachloride respectively of at least 1:1 within said column;
    (d) maintaining the descending liquid stream within said column at a temperature of at least 83 but below 110° C. whereby germanium tetrachloride vapors pass countercurrently through said descending liquid stream; and
    (e) withdrawing a vapor stream of highly purified germanium tetrachloride from overhead after countercurrent passage of the vapors through said column.

2. The process of claim 1 wherein the hydrochloric acid solution is constant boiling acid having a normality of about 6.1.

3. The process of claim 1 wherein the temperature of the descending liquid stream is maintained at between 83 and 100° C.

4. The process of claim 1 wherein the ratio of acid to germanium tetrachloride ranges from 1:1 to 4:1.

5. The process of claim 1 wherein the impure germanium tetrachloride is vaporized prior to its being fed into the column.

6. The process of claim 1 wherein the hydrochloric acid solution is preheated prior to its being passed into the column.

7. The process of purifying impure germanium tetrachloride containing arsenic as the predominant impurity comprising:
    (a) continuously passing constant boiling hydrochloric acid solution of about 6.1 normal through a packed column, said acid solution being introduced at the upper region of said column and providing a liquid stream descending through said column;
    (b) maintaining said stream substantially saturated with chlorine, the chlorine addition being made at approximately the same column level wherein the impure germanium tetrachloride is fed into said column;
    (c) continuously feeding the impure germanium tetrachloride into the column at a level below the middle thereof, the feeding rate being adjusted to maintain a ratio on a liquid volume basis of from 1:1 to about 4:1 of acid solution to germanium tetrachloride, respectively, within said column;
    (d) maintaining the temperature of the descending liquid stream between 83 and 100° C. whereby germanium tetrachloride vapors pass countercurrently through said descending liquid stream; and
    (e) withdrawing a vapor stream of highly purified germanium tetrachloride from overhead after countercurrent passage of the vapors through said column.

8. The process of claim 7 wherein a portion of the acid collected at the bottom of said column is recycled into the column at a level below the middle thereof.

9. The process of claim 7 wherein the column height is from 8 to 24 feet and the flow rates are adjusted to provide a retention time for the germanium tetrachloride vapors in the packed section of said column of from about 1 to 2 minutes.

10. The process of purifying impure germanium tetrachloride containing arsenic as the predominant impurity comprising:
    (a) sequentially passing a continuous stream of at least 6 normal hydrochloric acid solution through a first packed column and thereafter through a second packed column, said acid solution being introduced at the upper region of said columns and providing a liquid stream continuously descending through each column;
    (b) maintaining said liquid streams substantially saturated with chlorine;
    (c) maintaining the temperature of the liquid streams within said columns at between 83 and 100° C.;
    (d) sequentially feeding the impure germanium tetrachloride initially into said second column and thereafter into said first column at a level below the middle of each column, the flow rate thereof being adjusted to maintain within each column under steady state conditions of operation an excess of hydrochloric acid solution to germanium tetrachloride on a liquid volume basis; and (e) withdrawing a vapor stream of highly purified germanium tetrachloride from overhead of said first column after countercurrent passage of germanium tetrachloride vapors successively through said second and first columns respectively.

11. The process of claim 10 wherein the ratio of hydrochloric acid to germanium tetrachloride on a liquid volume basis passing through each column under steady state conditions is from 3:1 to 4:1.

12. The process of claim 10 wherein the germanium tetrachloride vapors collected from overhead of said second column are condensed and revaporized prior to passage thereof through said first column.

References Cited in the file of this patent
UNITED STATES PATENTS

| | | |
|---|---|---|
| 2,588,008 | Jones et al. | Mar. 4, 1952 |
| 2,811,418 | Theuerer | Oct. 29, 1957 |

OTHER REFERENCES

Perry: "Chemical Engineers' Handbook," third edition, pages 634, 643–646 (1950), McGraw-Hill, N.Y.